United States Patent
Pinard et al.

(10) Patent No.: US 8,726,630 B2
(45) Date of Patent: May 20, 2014

(54) SYSTEM AND METHOD FOR PASSIVE VALVING FOR PULSE DETONATION COMBUSTORS

(75) Inventors: Pierre Francois Pinard, Delmar, NY (US); Kevin Michael Hinckley, Saratoga Springs, NY (US); Venkat Eswarlu Tangirala, Niskayuna, NY (US); Adam Rasheed, Glenville, NY (US); David Michael Chapin, Niskayuna, NY (US); Anthony John Dean, Scotia, NY (US)

(73) Assignee: General Electric Company, Niskayuna, NY (US)

( * ) Notice: Subject to any disclaimer, the term of this patent is extended or adjusted under 35 U.S.C. 154(b) by 2006 days.

(21) Appl. No.: 11/566,041

(22) Filed: Dec. 1, 2006

(65) Prior Publication Data

US 2008/0229756 A1     Sep. 25, 2008

(51) Int. Cl.
| F02G 1/00 | (2006.01) |
| F02C 5/00 | (2006.01) |
| F02K 5/02 | (2006.01) |
| F02C 5/02 | (2006.01) |
| F02C 1/00 | (2006.01) |

(52) U.S. Cl.
USPC ............ 60/39.8; 60/39.38; 60/39.76; 60/247; 60/772

(58) Field of Classification Search
USPC .......... 60/247, 39.38, 39.76, 776, 39.8, 39.81
See application file for complete search history.

(56) References Cited

U.S. PATENT DOCUMENTS

| 1,980,266 | A | * | 11/1934 | Goddard | 60/247 |
|---|---|---|---|---|---|
| 2,697,327 | A | * | 12/1954 | Hazen et al. | 60/39.281 |
| 3,456,441 | A | * | 7/1969 | Graber | 60/247 |
| 3,462,955 | A | * | 8/1969 | Graber et al. | 60/249 |
| 4,415,328 | A | * | 11/1983 | Grunden et al. | 431/1 |
| 4,693,073 | A | * | 9/1987 | Blackburn | 60/778 |
| 4,835,963 | A | * | 6/1989 | Hardy | 60/274 |
| 4,947,641 | A | * | 8/1990 | Rodgers | 60/787 |
| 5,345,758 | A | * | 9/1994 | Bussing | 60/39.38 |
| 5,428,951 | A | * | 7/1995 | Wilson et al. | 60/776 |
| 5,791,889 | A | * | 8/1998 | Gemmen et al. | 431/1 |
| 5,901,550 | A | * | 5/1999 | Bussing et al. | 60/39.38 |
| 6,813,878 | B2 | * | 11/2004 | Kraft | 60/247 |
| 6,920,761 | B2 | * | 7/2005 | Laper | 60/772 |
| 2002/0059793 | A1 | * | 5/2002 | Kaemming et al. | 60/204 |

* cited by examiner

*Primary Examiner* — Gerald L Sung
(74) *Attorney, Agent, or Firm* — Scott J. Asmus

(57) ABSTRACT

A pulse detonation device contains a pulse detonation combustor which detonates a mixture of oxidizer and fuel. The fuel is supplied through fuel ducts and the fuel flow is controlled by fuel flow control devices. Oxidizer flow is provided through a main inlet portion and a flow control device directs the oxidizer flow to either the combustor or to a bypass duct, or both. The combustor further contains an ignition source. Each of the flow control devices, fuel flow control devices and ignition source are controlled by a control system to optimize performance at different thrust/power settings for the device.

37 Claims, 3 Drawing Sheets

SYSTEM AND METHOD FOR PASSIVE VALVING FOR PULSE DETONATION COMBUSTORS

BACKGROUND OF THE INVENTION

This invention relates to pulse detonation systems, and more particularly, to a method for passive valving of pulse detonation combustors.

With the recent development and interest in pulse detonation combustors (PDCs) and engines (PDEs), various efforts have been underway to develop PDCs for use in practical applications, such as combustors for aircraft engines. These efforts have included trying to maximize operating efficiency and duty cycle frequency for a given geometry of the pulse detonation combustor. It is noted that for the purposes of this application, pulse detonation combustor is to include all manner of pulse detonation devices, and is not to be limited to those pulse detonation devices used as combustors.

During the operation of PDCs a mixture of fuel and oxidizer (typically air) is detonated, to generate a high pressure shock wave. The high pressure gases generated by the detonation wave provide thrust, power or work energy, depending on the application of the PDC. Because the overall operation and construction of PDCs is known, a detailed discussion will not be provided herein.

The fuel and oxidizer amounts directed to the detonation chamber of a PDC are typically controlled by mechanical valves, which open and close at a frequency to operate the PDC at a certain fixed duty cycle, or frequency. Thus, the operational frequency of the PDC overall, is typically limited by the operational frequencies of the fuel and/or oxidizer valves. Thus, it is possible that although the geometry and configuration of the PDC will allow for a higher operational frequency, the frequency is limited by the valves. This prevents the PDC from operating at its fullest potential.

Additionally, mechanical valves in such an environment (i.e. high frequency, high temperature and high pressure) tend to have relatively limited operational lives, as well as high frequency maintenance requirements.

Additional efforts have been made to valve only the fuel flow, while the oxidizer flow remains constant. However, again with these types of systems the operational frequency of the PDC is limited by the operational frequency of the fuel flow valves, and in such systems the duty cycle of the PDC geometry is not optimized. Moreover, in such systems, varying the frequency of operation of the PDC (to increase or decrease thrust, power, etc.) is difficult to control efficiently.

Therefore, there is a need to control the operation of PDCs such that the duty cycle of a PDC is optimized, and the control of the fuel and oxidizer flow is simplified.

SUMMARY OF THE INVENTION

In an embodiment of the invention, a pulse detonation combustor (PDC) is controlled in a valveless manner, using an oxidizer flow system, fuel flow system and ignition control system which optimizes operational frequency of the PDC and achieves reliable turndown/turnup of thrust and/or power. An embodiment of the present invention, operates by monitoring the exit flow of the PDC to determine if the fuel/oxidizer mixture is being burned optimally, and then controls at least one of the oxidizer flow, fuel flow and ignition timing to ensure that optimization is maintained.

During operation of a PDC, the pressure pulse generated by the detonation is sufficient to effectively block the incoming flow of fuel and oxidizer (as the pressure wave propagates in all directions, and not just downstream). After a certain amount of time, often called "blowdown" time, the pressure drops such that fuel and oxidizer flow into the PDC can be re-established and a new fuel-oxidizer mixture is filled in the PDC. This new mixture is then ignited and detonates, again creating the pressure wave.

For optimal operation of the PDC, the fuel-oxidizer mixture should be enough to detonate, but without having excess fuel to cause fuel spill. With a fixed PDC geometry, a constant air flow essentially results in a fixed operational frequency for maximum power/thrust from the PDC (at other frequencies either too much or too little air flow exists). However, in an embodiment of the present invention, the air flow, fuel flow, and/or ignition timing can be adjusted to operate the PDC at varying frequency under optimal operational conditions, so that for any given thrust or power requirements a new optimal operation frequency can be obtained.

An embodiment of the present invention employs a variable flow inlet device for air flow and a variable frequency ignition source. In a further embodiment of the present invention, a variable fuel flow inlet device is employed to also vary the amount of fuel flow into the PDC.

As used herein, a "pulse detonation combustor" PDC (also including PDEs) is understood to mean any device or system that produces both a pressure rise and velocity increase from a series of repeating detonations or quasi-detonations within the device. A "quasi-detonation" is a supersonic turbulent combustion process that produces a pressure rise and velocity increase higher than the pressure rise and velocity increase produced by a deflagration wave. Embodiments of PDCs (and PDEs) include a means of igniting a fuel/oxidizer mixture, for example a fuel/air mixture, and a detonation chamber, in which pressure wave fronts initiated by the ignition process coalesce to produce a detonation wave. Each detonation or quasi-detonation is initiated either by external ignition, such as spark discharge or laser pulse, or by gas dynamic processes, such as shock focusing, auto ignition or by another detonation (i.e. cross-fire).

As used herein, the term "valve" is intended to describe any device that turns on and off a flow at a high frequency, namely, faster than or equal to the time scale of one pulse detonation combustion cycle. The term "flow control device" is intended to describe a device that operates slower than a valve. Namely, a "flow control device" controls the steady state flow rate of a flow at a rate which is slower than the time scale of one pulse detonation combustion cycle. For example, a "flow control device" as used herein would describe (but is not limited to) a flapper plate which directs portions of a flow, variable geometry inlet or outlet nozzles to affect flow rate; a metering needle valve or a pressure regulator.

BRIEF DESCRIPTION OF THE DRAWINGS

The advantages, nature and various additional features of the invention will appear more fully upon consideration of the illustrative embodiment of the invention which is schematically set forth in the figures, in which.

DETAILED DESCRIPTION OF THE INVENTION

The present invention will be explained in further detail by making reference to the accompanying drawings, which do not limit the scope of the invention in any way.

Figure 1:
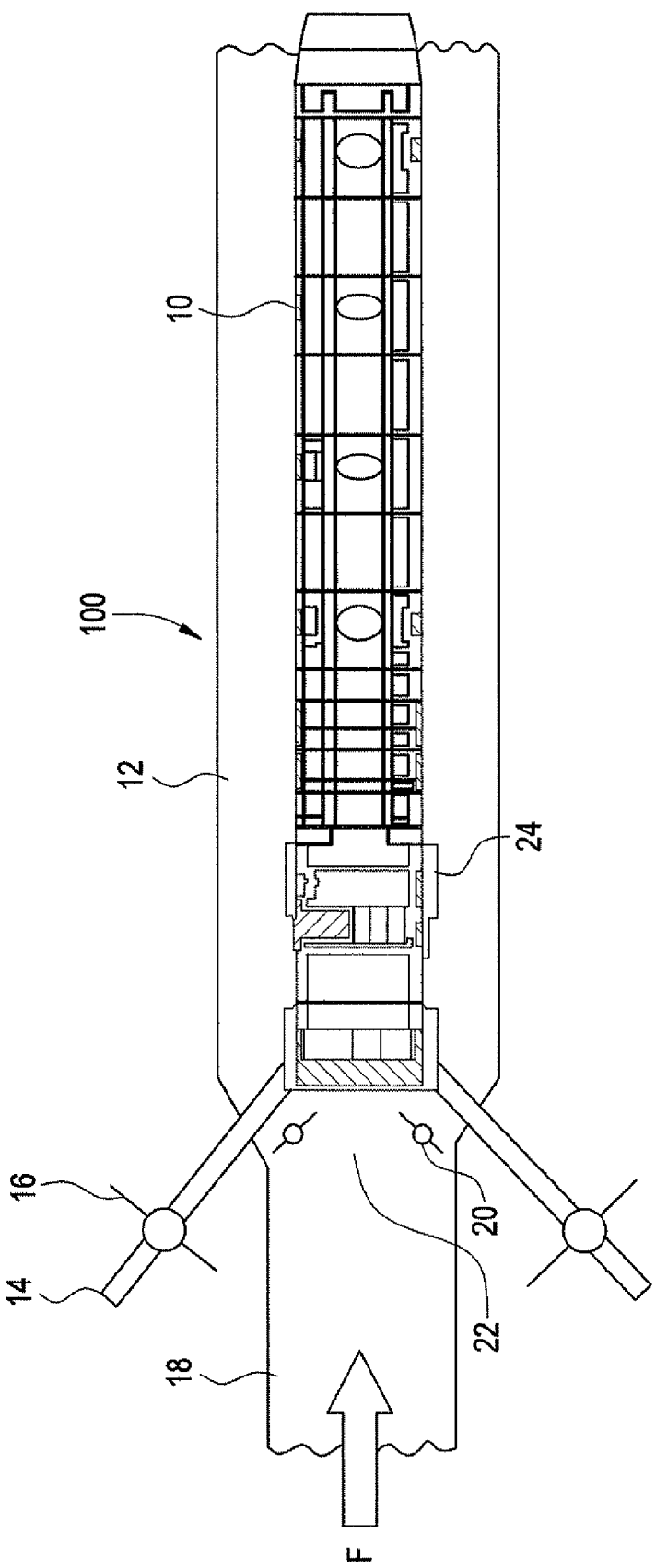
FIG. 1 shows a diagrammatical representation of a pulse detonation combustor in accordance with an embodiment of the present invention.

Turning now to FIG. 1 in which an embodiment of the present invention is depicted. In this figure a pulse detonation combustion system 100 is shown which contains at least one pulse detonation combustor 10. The structure and construction of the pulse detonation combustor 10 is that of any known pulse detonation combustor type device, and the present invention is not limited in this regard. Adjacent to the combustor 10 and at least partially surrounding the combustor 10 is a bypass flow duct 12. The bypass flow duct 12 allows air/oxidizer flow from an upstream air/oxidizer source (not shown). The upstream source can be a typical compressor stage, as known and used in gas turbine engines, or may be a source, such as a tank.

The flow F from the oxidizer source (not shown) is directed to a main inlet portion 18 which directs the flow to an inlet portion 22 of the pulse detonation combustor 10. In an exemplary embodiment of the present invention, within the main inlet portion 18 is flow control device 20 which is controllable via a control unit (not shown). The control device 20 directs the flow F to either the inlet portion 22 of the combustor 10 or to the bypass flow duct 12, or both. Thus, depending on the operational conditions the flow control device 20 directs an amount of flow to the combustor 10 and/or to the bypass flow duct 12. In an embodiment of the invention, as operational conditions change the amount of oxidizer flow going to the combustor 10 will change. For example, as the need for more power/thrust is indicated the flow control device 20 will direct more flow to the combustor 10 and away from the bypass flow duct 12, and as the need for power/thrust is decreased more flow is directed to the bypass flow duct 12.

In another exemplary embodiment of the invention, there is no flow control device 20 within the main inlet portion 18. In this embodiment, which is mechanically simplified, the oxidizer flow enters the main inlet portion 18 at some pressure and is directed to both the bypass duct 12 and the inlet portion 22 of the combustor 10 to fill the combustor 10. When a detonation occurs within the combustor 10, the propagating pressure/shock wave chokes the flow of the oxidizer at the inlet portion 22, and may actually propagate into the main inlet portion 18. Then as the pressure within the combustor 10 decreases below the level of the pressure in the main inlet portion 18, the oxidizer flow will reenter the combustor 10, and the bypass duct 12, and begin the purge and fill process for the next detonation within the combustor.

It is noted that the embodiment shown in FIG. 1 is an exemplary embodiment showing a flow control device 20 in the main inlet portion 18. However, it is understood that the embodiment shown in FIG. 1 is exemplary in nature to the embodiment without the flow control device(s) 20, and is representative of such an embodiment simply with the devices 20 removed. Further, in a further embodiment the oxidizer flow may be controlled by valves which operate at a frequency of the combustor 10 or faster.

It is further noted that FIG. 1 is intended to be a diagrammatical representation of the components of the present invention, and is not intended to limit the embodiments of the components used. For example, the manifold or ducting structure used to couple the main inlet portion 18, bypass flow duct 12 and inlet portion 22 of the combustor 10, can be of any configuration, as long as flow from the upstream source (not shown) can be directed to either or both of the combustor 10 and the bypass duct 12. Similarly, if employed, the flow control device 20 can be of any known structure or configuration, such as a variable flow control valve, which can vary the amount of oxidizer flow F to the combustor 10 and bypass flow duct 12.

In an exemplary embodiment, the bypass flow, directed through the bypass flow duct 12, is used to aid in cooling the combustor 10, where the exterior of the combustor 10 forms an interior surface of the bypass flow duct 12. In a further embodiment, the bypass flow is directed to exit at or near the exhaust of the combustor so as to contribute to the overall mass of the exhaust, thus adding to the thrust.

The fuel is directed to the combustor 10 from a fuel source (not shown) via a fuel duct or ducts 14. In an exemplary embodiment the fuel flow is valveless (similar to that discussed above regarding the oxidizer flow and will be discussed in more detail below), or in another embodiment the flow rate of the fuel is controlled where the amount of fuel flow is controlled via fuel flow control devices 16. In a further embodiment the fuel pressure is regulated by the devices 16 which may be fuel pressure regulators of any known type.

In the controlled embodiment, the fuel flow control devices 16 are also controlled via a control system (not shown) to control the amount of fuel injected into the combustor 10 to optimize operational efficiency at a given duty cycle for the combustor 10. Thus, for example, as with the oxidizer flow, as the thrust/power requirement increases, the amount of fuel flow is increased (via the devices 16), and as the thrust/power requirement is decreased the fuel flow (via the devices 16) is decreased. The connection of the fuel ducts 14 to the combustor 10 is via any known or commonly used methods. The present invention is not limited in this regard, as it is contemplated that the fuel flow can be injected into the oxidizer flow either upstream or downstream of the inlet 22, or both.

In one embodiment of the invention, the control system employed (not shown) is an open loop control system based on the known behavior of the flow control devices and passages, whereas in an alternative embodiment, the system is a closed loop control system where a sensing device is used to correct the commands of the control system to optimize the PDC operation. Those of ordinary skill in the art are capable of implementing each of these systems with regard to the present invention. In a further embodiment of the present invention, the control system is a combination of both open and closed loop systems. For example, at an initial setting an open loop control system is used to set all initial settings and then as the operation progresses a closed loop portion of the system employs feedback from a sensing device to modify or adjust various operational parameters. It is also contemplated that any combination of the above discussed control systems may be employed.

Thus, in an embodiment of the invention, the fuel-to-oxidizer ratio is adjusted to achieve the optimal ratio within the combustor 10, for an optimal detonation and operational efficiency (for example, no wasting of fuel).

In another exemplary embodiment of the present invention, the fuel flow from the fuel source is not obstructed by any active fuel flow control device. In this embodiment, the fuel flow is directed to the combustor 10 under a fuel pressure, and as with the oxidizer flow, when a detonation occurs the pressure within the combustor 10 effectively stops the fuel flow into the combustor 10. Then as the pressure within the combustor drops below the fuel pressure (e.g. during blow down) the fuel begins to reenter the combustor 10 to begin the fill process for the next detonation.

Again, it is noted that the embodiment shown in FIG. 1 is an exemplary embodiment showing fuel control devices 16 and the immediately above described embodiment is valveless.

However, it is understood that the embodiment shown in FIG. 1 is exemplary in nature to the embodiment without the devices 16, and is representative of such an embodiment simply with the devices 16 removed. Therefore, the present invention contemplates a system where the fuel flow is completely valveless and has no flow control devices 16, or a system where the fuel flow is also valveless but the fuel flow rate/pressure is controlled via devices 16.

Thus, it is noted that within the present invention, the description of the fuel and oxidizer flow as being "valveless" is not intended to indicate that there is no flow control device of any kind between the fuel/oxidizer source and the combustor 10. It is understood that upstream flow control devices may be used to control flow rates and or shut off flow during times of operation when the combustor 10 is not being used. This embodiment of the present invention is directed to systems where there are no valves which open and close at or faster than the frequency of operation of the combustor so as to essentially pulse fuel into the combustor for operation.

In a further embodiment of the present invention, the fuel flow devices 16 (or any other similar flow control device) are used to control the fuel flow rate between the fuel source and the combustor 10. In this embodiment, fuel supply is not mechanically interrupted during the combustor 10 operation, but the amount or flow rate of the fuel is adjusted based on the operational parameters (which will be discussed in more detail below). Similarly, in another exemplary embodiment, the flow control valves 20 are used to control the amount of oxidizer flow to the duct 12, and are not used to completely block flow, but simply redirect at least a portion of the oxidizer flow. However, in a further embodiment, the oxidizer flow is controlled by valves (not shown) which operate at or faster than the operational frequency of the combustor 10. The present invention contemplates having the oxidizer flow either valved or controlled via flow control devices, or a combination of both.

Such control of the fuel rate and/or oxidizer rate would prevent fuel from being wasted during operation. As stated above, when the pressure within the combustor 10 begins to drop, fuel and oxidizer will begin to flow back into the combustor 10 for the next detonation. However, if the fuel pressure is too high and/or the oxidizer pressure is too low, then fuel may enter the combustor 10 before a proper purge and/or fill (for example) occurs. This would result in a waste of fuel as some fuel would be dumped out of the combustor during the purge process (for example). By employing the control system of the present invention (discussed in more detail below) this may be avoided.

As described above, the fuel and/or oxidizer flow into the combustor 10 is regulated by the pressure rises and decreases in the combustor 10, due to the detonations. In an embodiment of the invention, the flow of the fuel and/or the oxidizer is stopped and started by the pressure rises and decreases. It is of course understood that because of the pressure of the flow of the oxidizer and/or fuel, in some embodiments of the invention, these flows may not be completely stopped during the peak pressure rise. Namely, at least some fuel and/or oxidizer may continue to leak into the combustor 10. However, the flow is reduced sufficiently that it is effectively stopped.

In a further embodiment of the present invention, the geometry or configuration of the inlet or injection portions for the oxidizer and fuel are such that as the pressure drops in the combustor 10, the oxidizer flow enters the combustor 10 before a significant amount of fuel enters. Such a configuration allows a slug of oxidizer to enter the chamber 10 before a sufficient amount of fuel enters. The presence of the slug aids in preventing fuel that enters the oxidizer from igniting or detonating prematurely because of residual heat in the combustor 10 from a previous detonation. In an embodiment of the present invention, the geometry of the fuel injection nozzle is that of a converging or converging-diverging nozzle. In a further embodiment, the fuel injection point contains an orifice plate, perforated plate, baffles, or the like, which assists in delaying the flow of fuel into the combustor 10 as required. In yet a further embodiment, the configuration of the fuel inlet system is used to delay the flow of fuel. For example, it is contemplated that a serpentine fuel line be employed leading into the combustor 10. The use of such a geometry or configuration also assists in delaying the flow of fuel into the combustor 10.

In a further alternative embodiment of the present invention, the relative system pressure of the fuel flow and oxidizer flow is used to regulate the timing of the fuel entry into the combustor. Namely, the oxidizer pressure is at a level higher than that of the fuel such that as the combustor 10 pressure drops the oxidizer enters prior to the fuel.

Additionally, coupled to the combustor 10 is an ignition source 24, which is used to ignite the fuel-oxidizer mixture in the combustor 10, which leads to the detonation. The ignition source 24 can be of any known or commonly used type of ignition source, such as a spark, which is known or commonly used in pulse detonation applications. In a further embodiment, more than one ignition source 24 is used.

Additionally, in another embodiment of the present invention, the ignition source 24 (or sources) is a variable frequency ignition source, in which the timing of the ignitions can be adjusted. In such an embodiment, the timing or frequency of the ignitions is control by the control device (not shown) so as to adjust the detonation frequency of the combustor 10.

In an exemplary embodiment, to increase thrust/power the bypass ratio of oxidizer flow is reduced (i.e. more air to the combustor 10) and fuel flow is increased. This increases the fill rate of the combustor 10, and thus increases the frequency at which the combustor 10 can be operated. Accordingly, the ignition frequency of the ignition source 24 is increased. Alternatively, in the reverse, when less thrust/power is desired, the bypass ratio is increased, the fuel flow is decreased, and the ignition frequency is decreased.

In an alternative embodiment of the present invention, the oxidizer flow is controlled similar to the fuel flow. Specifically, the amount of flow to the combustor is controlled, but there is no bypass flow. Such embodiments would include those in which the oxidizer source is a closed source or an "on-board" source (similar to a fuel system). In such an embodiment, the flow control device 20 would control the amount of flow to the combustor 10, and would not direct any excess flow to a bypass duct 12, or the like.

In an embodiment of the invention, the system (not shown in FIG. 1) automatically controls the operation of the flow control device(s) 20, fuel flow control device(s) 16 and the ignition source 24, based on desired performance and operational parameters. For example, the control system, which employs a control device, controls the components based on input signals from throttle or power settings and/or various inlet conditions, such as air pressure. In a further embodiment, each of the above components are coupled to their own distinct control system or device. As stated above, this control may be merely controlling the flow rate or pressure of the fuel and/or oxidizer, but not shutting off flow or one or the other completely. In a further embodiment, the control system may only change the timing of the ignition, and in a further exemplary embodiment may only control the timing of the ignition and/or the fuel flow rate/pressure.

In an embodiment of the invention, the control system(s) employed uses a pre-programmed model or settings for each of the controlled components based on the desired operational criteria (for example, throttle/power settings, operational parameters, etc.). In a further embodiment of the present invention, the control system(s) employs a feedback loop which monitors certain operational parameters to be used to control the components to be controlled. In an embodiment, exit parameters of either the combustor 10 or the device 100 (or both) are monitored to determine what adjustments, if any, are to be made to any of the flow control device(s) 20, fuel flow device(s) 16, and or ignition source 24 timing.

In an embodiment of the invention, the relative pressures of the oxidizer flow and fuel flow, into the combustor 10 are controlled so as to optimize efficiency during purge and blowdown of the combustor 10. Specifically, the relative pressure of the oxidizer flow is higher than that of the fuel flow (this can also be controlled by the effective inlet areas of the oxidizer and fuel into the combustor 10). Thus, during operation as the pressure within the combustor 10 decreases (during blowdown) the higher pressure oxidizer flow begins to enter the combustor 10. This assists in the purge process, without wasting fuel during purge. As the pressure continues to drop within the combustor 10, the fuel begins to enter the combustor 10 and mix with the oxidizer (i.e. the fill stage), and when the optimal mixture is attained the mixture is ignited via the ignition source 24, and a detonation occurs.

In additional embodiments, various other methods of controlling the combustor may be used, including varying the purge fraction, i.e. the percentage of the combustion tube volume filled with inert gases or oxidizer between pulses; varying the fill fraction, i.e. the percentage of the combustor tube filled with a detonable fuel mixture prior to detonation, varying the cross-sectional area of the exit nozzle of the combustor 10, and varying the fill/operating pressure.

In an additional embodiment of the present invention, the bypass air flow is directed to additional combustors 10, such that the bypass flow is used to provide oxidizer for additional pulse detonation combustors 10. In such an application, the additional pulse detonation combustors 10 are only operated when sufficient bypass flow exists to provide the necessary fuel-oxidizer flow for detonation.

In a further exemplary embodiment, the bypass flow is directed to a traditional combustion device, such as the type used in a typical gas turbine engine. For example, the second combustion device is a steady pressure combustion device. In an exemplary embodiment of this aspect of the invention, as the bypass flow increases (i.e. the combustor 10 is decreasing in power/thrust output) the bypass flow is directed to a steady pressure combustor (not shown) which begins operation when the necessary fuel-oxidizer ratio is reached to maintain steady pressure deflagration. Such an embodiment can be used in certain operational conditions, such as climb-out or decent, in aircraft applications, where the conditions are not optimal for maximum operation of the pulse detonation combustor 10. Then as conditions reach levels where the combustor 10 can be used more efficiently, the oxidizer flow is primarily directed to the combustor 10, and the secondary combustor (not shown) is shut down such that only the excess bypass flow flows through it.

Figure 2:
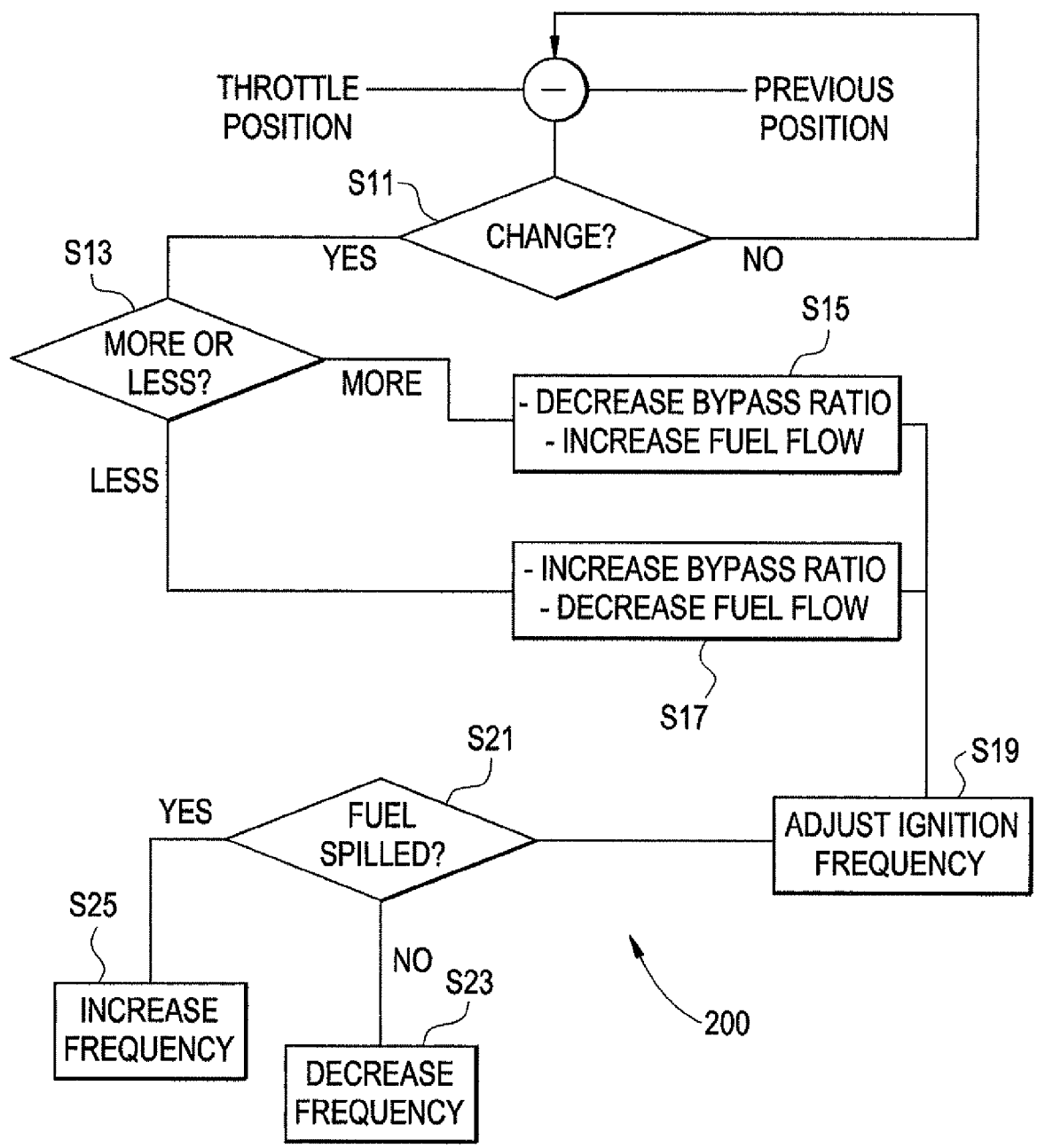
FIG. 2 shows a flow chart of a method of operation of a pulse detonation combustor in accordance with an embodiment of the present invention.
Figure 3:
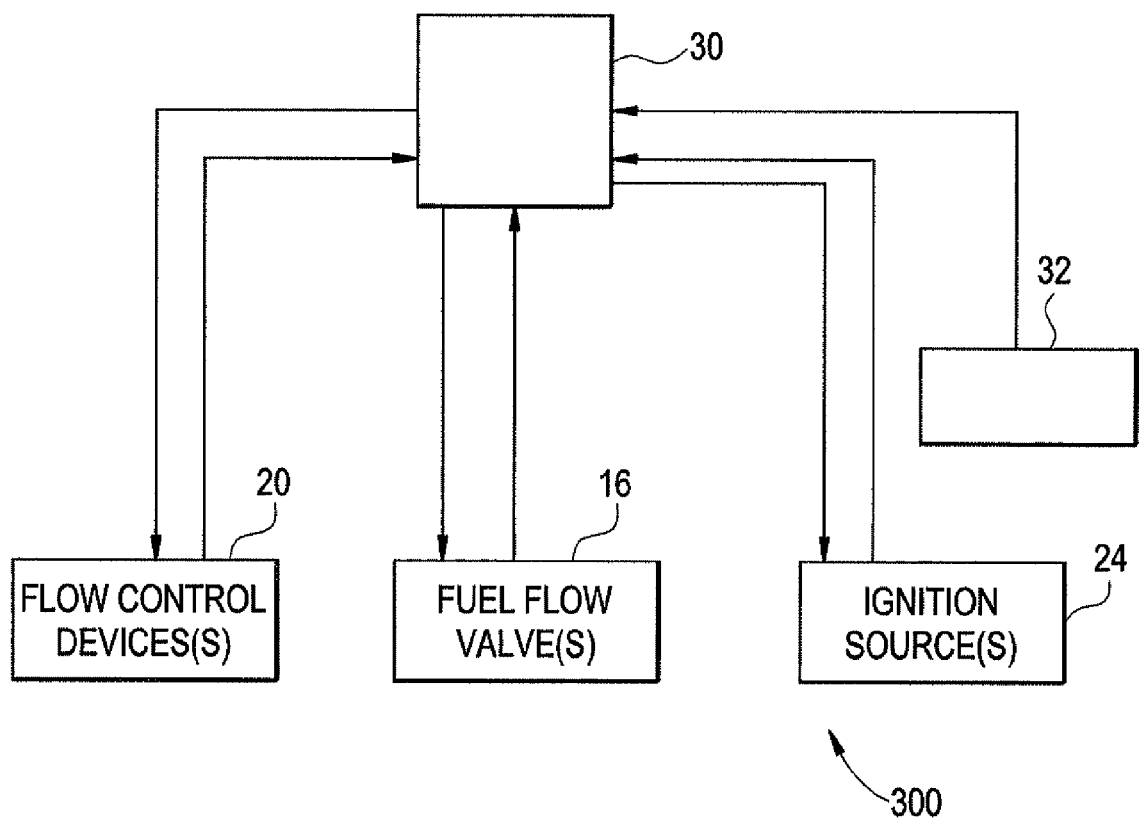
FIG. 3 shows a diagrammatical representation of a control system in accordance with an embodiment of the present invention.

Turning now to FIGS. 2 and 3, the method of control the combustor 10 in accordance with an embodiment of the present invention will be discussed. As discussed above, this method may be implemented with a control system (not shown in FIG. 1) to control flow control device(s) 20 (if present), fuel flow device(s) 16 (if present) and the ignition source(s) 24. Further, it is noted that the system of the present invention can be employed in both autopilot and manned controlled systems. Namely, the present invention can receive control signals from any input, whether automatic or pilot controlled, and as indicated above can control the operation based on either a closed loop or open loop type control system.

A diagrammatical representation of the control system 300 is shown in FIG. 3. This embodiment of the control system 300 includes a control device 30, which can be of any known type of computing or logic device which is capable of receiving data and providing control signals to any of the above components based on the received data. In a further embodiment, the control system 300 does not issue the control signals based on received data, but from preset settings for specific operating conditions and parameters, such as from a look-up-table. In this embodiment, the sensor 32 and feedback loop is not present, and the control signals are issued based on preset settings and criteria, such as operational conditions, throttle setting, etc. Because both of these types of systems are well known, only the operation of the first embodiment will be discussed in detail. However, a skilled artisan will be able to implement both embodiments.

In the first embodiment discussed above, a sensor 32 (or sensors) is placed at or near an exit of either the device 100 or the combustor 10, or both, to detect various exhaust parameters. In an exemplary embodiment of the invention, the sensor detects the presence and/or amount of un-burned fuel in the exhaust. A feedback loop is employed to allow for data signals from the sensor 32 to be sent to the control device 30. Based on the signals received from the sensor(s) 32, the control device 30 provides operation instructions to at least one, or all, of the flow control device(s) 20 (if present), the fuel flow device(s) 16 (if present), and ignition source(s) 24. In the embodiment shown in FIG. 3, there is a feedback signal from each of the controlled components. However, it is contemplated that in an alternative embodiment, the feedback loops from the controlled components is not present.

Again, as indicated above, embodiments of the present invention may not include flow control device(s) 20 or fuel flow device(s) 16. Further, the flow control device(s) 20 may also be valves. However, these devices, if present, are used to regulate the rate or pressure of the flow of the oxidizer and/or fuel (respectively). In embodiments of the invention such as this the general configuration of the control system 300 would be similar to that shown in FIG. 3.

Turning now to FIG. 2 and the embodiment shown therein (employing at least one sensor 32), a method of operation of an exemplary embodiment of the invention will now be described. As shown, in this embodiment the throttle position is monitored and at operation S11 a determination of whether or not a change in throttle position is made. If no change has been made, the operation S11 is performed again until such time as it is determined that a change has been made. When it is determined that a change has been made in the throttle position, a next operation S13 determines whether the throttle position has been changed to provide more or less thrust/power. If it is determined that the throttle has been changed to increase power/thrust the bypass ratio is reduced (i.e. more oxidizer flow to the combustor 10) and the amount of fuel flow is increased at operation S15. If it is determined that the throttle has been changed to decrease the thrust/power, the bypass ratio is increased (i.e. less oxidizer flow to the combustor 10) and the fuel flow is decreased at operation S17.

In a further embodiment, where the fuel flow is not controlled an adjustment can be made only to the oxidizer flow, and vice-versa. Additionally the frequency of detonation can be adjusted.

Following the adjustment to the bypass ratio and fuel flow (regardless of the adjustment), at operation S19 the ignition frequency is adjusted. In an embodiment of the invention, the frequency adjustment is made based on a predetermined schedule of adjustments based on operational criteria such as throttle setting and operational parameters. For example, in an embodiment of the present invention if operation S15 is performed, then the ignition frequency is increased by some predetermined amount, and if operation S17 is performed the ignition frequency is reduced by a predetermined amount. In an alternative embodiment, the amount of ignition frequency adjustment is based on operational parameters. In a further embodiment, at operation S19 the frequency is not adjusted, but is adjusted at a later time after a performance evaluation of the system has been conducted. In a further embodiment of the present invention, the control system is a combination of both open and closed loop systems. For example, at an initial setting an open loop control system is used to set all initial settings and then as the operation progresses a closed loop portion of the system employs feedback from a sensing device to modify or adjust various operational parameters. It is also contemplated that any combination of the above discussed control systems may be employed.

After the ignition frequency is adjusted (or not adjusted) a determination is made regarding fuel spillage. At operation S21 it is determined whether excess fuel has been injected into the combustor 10. In an embodiment of the invention, this determination is made based on readings from the sensor(s) 32. If too much fuel was injected into the combustor 10, then excess fuel (which did not burn or otherwise be consumed in the detonation) would be ejected through the exhaust of either the combustor 10 and/or the device 100.

If the sensor(s) 32 detects the spillage of fuel, at operation S25 the ignition frequency is increased. If the sensor(s) 32 detects no spillage of fuel, then the ignition frequency is decreased. In an embodiment of the invention, the amount of frequency increase or decrease may be a predetermined amount. In a further embodiment, the frequency adjustment is based on a detected amount of fuel spillage, such that the amount of adjustment is based on the amount of fuel spillage detected.

In a further embodiment of the present invention, an additional control loop is provided such that after the ignition frequency is adjusted in either operations S23 or S25, a further determination is made regarding fuel spillage until such time as an optimal ignition frequency is determined for a given throttle position. Then the settings remain constant until such time the throttle position is changed again.

The above description regarding FIG. 2 is intended to be exemplary, and it is understood that the above described and control shown in FIG. 2 may be modified to accommodate the specific configuration of the present invention employed. For example, the above description may be easily modified to accommodate systems where (1) either one of, or both, of the fuel flow and oxidizer flow is uncontrolled, (2) either one of, or both, of the fuel flow and oxidizer flow is controlled such that the flow rate/pressure is changed but flow is continuous, (3) the oxidizer flow is controlled by a valve such that flow is completely stopped at a frequency matching or essentially matching that of the detonations in the combustor 10, and (4) any combination thereof.

While the invention has been described in terms of various specific embodiments, those skilled in the art will recognize that the invention can be practiced with modification within the spirit and scope of the claims.

What is claimed is:

1. A pulse detonation device, comprising:
a pulse detonation combustor;
a main inlet portion through which an oxidizer passes coupled to said pulse detonation combustor;
a fuel supply portion coupled to said pulse detonation combustor which supplies a fuel to said pulse detonation combustor;
a variable frequency ignition source coupled to said pulse detonation combustor to ignite a mixture of said fuel and said oxidizer provided from said main inlet portion; and
a control system which controls at least one of a flow of said oxidizer, a flow of said fuel and said variable frequency ignition source at a plurality of operating conditions of said combustor,
wherein a pressure pulse generated by a detonation within said pulse detonation combustor regulates said supply of fuel from said fuel supply portion by blocking the incoming flow of fuel; and
wherein said control system continually increases or decreases an ignition frequency of said variable frequency ignition source in response to changes in said operating conditions.

2. The pulse detonation device of claim 1, farther comprising a bypass flow duct, wherein said main inlet portion is coupled to both of said pulse detonation combustor and said bypass flow duct.

3. The pulse detonation device of claim 1, wherein said main inlet portion has at least one flow control device which directs flow within said main inlet portion to said pulse detonation combustor.

4. The pulse detonation device of claim 1, wherein said fuel supply portion has a fuel flow device which controls the flow of fuel to said pulse detonation combustor.

5. The pulse detonation device of claim 1, further comprising a sensor coupled to either said pulse detonation device and said pulse detonation combustor, wherein said sensor is also coupled to said control system.

6. The pulse detonation device of claim 5, wherein said control system controls said at least one of said flow of said oxidizer, flow of said fuel and said variable frequency ignition source based on an output signal from said sensor.

7. The pulse detonation device of claim 5, wherein said sensor detects an amount of unused fuel in an exhaust passing through said exhaust portion.

8. The pulse detonation device of claim 1, wherein said control system controls said at least one of said flow of said oxidizer, flow of said fuel and said variable frequency ignition source to prevent excess fuel from being added to said combustor at said plurality of operating conditions.

9. The pulse detonation device of claim 1, wherein said control system controls said at least one of said flow of said oxidizer, flow of said fuel and said variable frequency ignition source at a plurality of operating frequencies of said combustor.

10. The pulse detonation device of claim 1, wherein said control system changes an amount of oxidizer flow from said main inlet portion to said combustor as said operating conditions change.

11. The pulse detonation device of claim 1, wherein said control system changes an amount of fuel flow as said operating conditions change.

12. The pulse detonation device of claim 1, wherein said pressure within combustor starts and stops said fuel flow.

13. A pulse detonation device, comprising:
a pulse detonation combustor;
a main inlet portion through which an oxidizer passes coupled to said pulse detonation combustor, said main inlet portion having at least one flow control device which directs at least a portion of said flow of said oxidizer to said pulse detonation combustor;
a fuel supply portion coupled to said pulse detonation combustor which supplies a fuel to said pulse detonation combustor;
a variable frequency ignition source coupled to said pulse detonation combustor to ignite a mixture of said fuel and an oxidizer provided from said main inlet portion; and
a control system which controls at least one of said flow of said oxidizer and said variable frequency ignition source at a plurality of operating conditions of said combustor,
wherein a pressure pulse generated by a detonation within said pulse detonation combustor regulates said flow of fuel from said fuel supply portion and said flow from said oxidizer by blocking the incoming flow of fuel; and
wherein said control system continually increases or decreases an ignition frequency of said variable frequency ignition source in response to changes in said operating conditions.

14. A method of controlling a pulse detonation combustor; said method comprising:
operating said pulse detonation combustor at a first operating condition;
changing said pulse detonation combustor from said first operating condition to a second operating condition;
providing an amount of oxidizer and fuel to said pulse detonation combustor, and changing an ignition frequency of said pulse detonation combustor by continually increasing or decreasing an ignition frequency of a variable frequency ignition source to effect said change from said first operating condition to said second operating condition; and
regulating said fuel flow to said pulse detonation combustor using a pressure pulse generated by a detonation within said pulse detonation by blocking the incoming flow of fuel.

15. The method of claim 14, wherein each of said amount of oxidizer entering said combustor, amount of fuel entering said combustor, and ignition frequency of said combustor are changed to effect said change from said first operating condition to said second operating condition.

16. The method of claim 14, further comprising changing an operational frequency of said combustor to effect said change from said first operating condition to said second operating condition.

17. The method of claim 14, further comprising monitoring an exhaust of said combustor.

18. The method of claim 17, wherein said changing of at least one of said oxidizer amount, fuel amount and ignition frequency is based on results of said monitoring of said exhaust.

19. The method of claim 14, wherein said amount of oxidizer entering said combustor and ignition frequency of said combustor are changed to effect said change from said first operating condition to said second operating condition.

20. The method of claim 14, further comprising starting and stopping said fuel flow to said pulse detonation combustor using pressure within said pulse detonation combustor.

21. The method of claim 14, further comprising causing said fuel to enter said combustor after said oxidizer enters said combustor.

22. A method of controlling a pulse detonation combustor; said method comprising:
determining if an operating condition of said pulse detonation combustor has changed;
determining if said change requires an increase or a decrease in output from said pulse detonation combustor; wherein
if said change requires an increase, increasing an amount of at least one of an oxidizer and fuel to said pulse detonation combustor by continually increasing or decreasing an ignition frequency of a variable frequency ignition source to effect said change; and
if said change requires a decrease, decreasing an amount of at least one of said oxidizer and fuel to said pulse detonation combustor by continually increasing or decreasing an ignition frequency of a variable frequency ignition source to effect said change, and
regulating said fuel flow to said pulse detonation combustor using a pressure pulse generated by a detonation within said pulse detonation combustor by blocking the incoming flow of fuel.

23. The method of claim 22, wherein if said change requires an increase, increasing an amount of both said oxidizer and fuel to said combustor; and if said change requires a decrease, decreasing an amount of both of said oxidizer and fuel to said combustor.

24. The method of claim 22, further comprising changing an ignition frequency of an ignition source in said combustor to effect said change.

25. The method of claim 22, further comprising determining if an excess fuel amount is added to said combustor and controlling said increasing or said decreasing step based on said determination of an excess fuel amount.

26. The method of claim 25, wherein said determination of an excess fuel amount includes sensing an excess fuel amount in an exhaust of said combustor.

27. The method of claim 24, wherein if said change requires an increase, increasing said ignition frequency, and if said change requires a decrease, decreasing said ignition frequency.

28. The method of claim 22, further comprising starting and stopping said fuel flow to said pulse detonation combustor using pressure within said pulse detonation combustor.

29. The method of claim 22, further comprising causing said fuel to enter said combustor after said oxidizer enters said combustor.

30. A method of operating a pulse detonation combustor; said method comprising:
providing a flow of oxidizer to said pulse detonation combustor;
providing a flow of fuel to said pulse detonation combustor; and
providing a variable frequency ignition source within said pulse detonation combustor,
wherein said flow of fuel to said pulse detonation combustor is regulated by continually increasing or decreasing an ignition frequency of the variable frequency ignition source to effect said change based on a pressure pulse generated by a detonation within said pulse detonation combustor by blocking the incoming flow of fuel.

31. The method of claim 30, wherein a rate or pressure of said flow of fuel is controlled by at least one flow control device.

32. The method of claim 30, wherein said flow of oxidizer is regulated with pressure within said pulse detonation combustor.

33. The method of claim 30, wherein said flow of oxidizer is controlled by at least one flow control device.

34. The method of claim 30, further comprising changing at least one of said flow of oxidizer, said flow of fuel, and an ignition frequency of said ignition source based on a change in an operating condition of said pulse detonation combustor.

35. The method of claim 30, wherein said flow of oxidizer is controlled by a valve.

36. The method of claim 30, further comprising starting and stopping said fuel flow to said pulse detonation combustor using pressure within said pulse detonation combustor.

37. The method of claim 30, further comprising causing said fuel to enter said combustor after said oxidizer enters said combustor.

* * * * *